US008521882B2

(12) United States Patent
Amsterdam et al.

(10) Patent No.: US 8,521,882 B2
(45) Date of Patent: Aug. 27, 2013

(54) CLIENT/SUBSCRIBER ROTATION USING SELECT WRITE CALLS FOR SERVER RESILIENCY (75) Inventors: Jeffrey D. Amsterdam, Roswell, GA (US); Brian W. Jensen, Raleigh, NC (US); Brian M. O'Connell, Research Triangle Park, NC (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 401 days.

(21) Appl. No.: 12/882,829

(22) Filed: Sep. 15, 2010

(65) Prior Publication Data
US 2012/0066290 A1      Mar. 15, 2012

(51) Int. Cl.
*G06F 15/173* (2006.01)

(52) U.S. Cl.
USPC .......................................... 709/226

(58) Field of Classification Search
USPC .................................. 709/203, 226
See application file for complete search history.

(56) References Cited

U.S. PATENT DOCUMENTS

| 6,173,312 | B1 | 1/2001 | Atarashi et al. |
| 6,343,313 | B1 | 1/2002 | Salesky |
| 6,788,939 | B2 | 9/2004 | Truong et al. |
| 6,996,570 | B2 | 2/2006 | Noble et al. |
| 7,290,056 | B1 | 10/2007 | Mclaughlin |
| 7,437,461 | B2 | 10/2008 | Sugizaki |
| 7,730,190 | B2 | 6/2010 | Coile et al. |
| 2001/0027491 | A1 | 10/2001 | Terretta et al. |
| 2001/0039585 | A1* | 11/2001 | Primak et al. ............... 709/228 |
| 2002/0116258 | A1 | 8/2002 | Stamatelatos et al. |
| 2003/0061363 | A1* | 3/2003 | Bahl et al. ................... 709/229 |
| 2005/0177833 | A1* | 8/2005 | Sauermann ................. 718/105 |
| 2006/0036679 | A1 | 2/2006 | Goodman et al. |
| 2006/0224668 | A1 | 10/2006 | Ginis |
| 2007/0014243 | A1 | 1/2007 | Breuer et al. |
| 2007/0061282 | A1 | 3/2007 | Ganguly et al. |

(Continued)

FOREIGN PATENT DOCUMENTS

| EP | 1793562 A1 | 6/2007 |
| EP | 1968275 A1 | 9/2008 |
| EP | 2045967 A2 * | 8/2009 |
| WO | 2005074487 A2 | 8/2005 |

OTHER PUBLICATIONS

Schlossnagle, Theo; Mod_Backhand use your resources; http://www.backhand.org/ApacheCon2001/US/backhand_course_notes.pdf; Apr. 5, 2001.

(Continued)

*Primary Examiner* — Lance L Barry
(74) *Attorney, Agent, or Firm* — Arthur Samodovitz; Robert C. Rolnik (57) ABSTRACT A computer implemented method, system, and computer program product for managing client connections to a server among a plurality of clients. A messaging server detects, by a first server, an attribute of a client connection that exceeds a threshold, wherein the attribute is a select write operation. The messaging server selects a client that connects to a server, responsive to detecting the attribute of the client exceeding the threshold of select write calls. The messaging server selects a connect mechanism of a second server, responsive to selecting the client. The messaging server transmits a migrate message to the client, the migrate message comprising at least a uniform resource identifier (URI).

18 Claims, 5 Drawing Sheets

(56) References Cited

U.S. PATENT DOCUMENTS

| | | |
|---|---|---|
| 2007/0174233 A1 | 7/2007 | Ginis et al. |
| 2007/0190980 A1* | 8/2007 | Britt et al. .................. 455/414.1 |
| 2008/0102815 A1 | 5/2008 | Sengupta et al. |
| 2009/0067850 A1 | 3/2009 | Mizutani et al. |
| 2009/0248865 A1 | 10/2009 | Kodama et al. |
| 2010/0169494 A1 | 7/2010 | Machulsky et al. |

OTHER PUBLICATIONS

Srinivasan, Kiran; MTCP: Transport Layer Support for Highly Available Network Services; http://citeseerx.ist.psu.edu/viewdoc/download?doi-10.1.125.5921&rep=1&type=pdf; Oct. 2001.

Brian O'Connell; Behavior Based Client Selection for Disparate Treatment ; U.S. Appl. No. 12/968,429; Dec. 15, 2010.

* cited by examiner

CLIENT/SUBSCRIBER ROTATION USING SELECT WRITE CALLS FOR SERVER RESILIENCY

BACKGROUND OF THE INVENTION

1. Field of the Invention

The present invention relates generally to a computer implemented method, data processing system, and computer program product for managing processing loads on a server. More specifically, the present invention relates to selecting clients having demonstrable high processing loads and migrating communication tasks to such clients to a second server.

2. Description of the Related Art

People have become increasingly dependent on receiving reports of specific events or news to suit the tastes of individual computer users. In recent decades, computers have transformed from a largely academic tool with occasional personal uses, to a personal accessory among those who want to remain informed. Accordingly, a diversity of clients are in use today. Such clients operate in a variety of computers in a manner to assist users who subscribe to newsworthy and other events.

Clients operating in a network provide reports to users in real-time, for example, on each update of tennis scores among several matches being held simultaneously. A client includes data processing system resources allocated to executing computer instructions to render data concerning messages and topics to a user through any convenient user interface. A client may perform other functions in support of messaging, such as, allow a user to configure the language of the client, establish power saving modes, and inform the user of errors and status of the client. In contrast, client software is the instructions of the client serialized to storage or for transmission.

In a specific example, thousands of subscribers of a type of computer known as the smartphone, can be updated within seconds of a score changing in the Tennis U.S. Open. Because of the variety of computers, and the variety of networking environments used to connect, a portion of clients can fail to acknowledge or otherwise responsively cooperate with queues of messages sent from a server.

The reasons to fail to acknowledge or otherwise accept messages include, for example, interference by a proxy, a slow transmitting modem, the client being located on a different continent, or a poorly operating client on the computer, to name a few. In other words, although a client may send responsive packets to a server, the packets might not reach the server in time because the packets are lost, or delayed. A packet is a unit into which information is divided for transmission across the Internet. A packet may include administrative information such as source, destination, serial number, protocol type and the like. In addition, some clients may run applications that delay the responses that a server expects from the clients. This condition, as well, places a heavier load on a server than does the condition of a client that immediately responds to messages.

Social media is another scenario where clients, and especially mobile clients, may subscribe to topics. For example, hundreds of thousands of users may subscribe to a single celebrity, using for example, Twitter® social media or Facebook® social media. If such topics are delivered by a publish/subscribe mechanism, potentially, slow or turned-off clients may create processing delays at the server.

A suitable remedy is sought.

SUMMARY OF THE INVENTION

A computer implemented method, system, and computer program product for managing client connections to a server among a plurality of clients. A messaging server detects, by a first server, an attribute of a client connection that exceeds a threshold, wherein the attribute is a select write operation. The messaging server selects a client that connects to a server, responsive to detecting the attribute of the client exceeding the threshold of select write calls or operations. The messaging server selects a connect mechanism of a second server, responsive to selecting the client. The messaging server transmits a migrate message to the client, the migrate message comprising at least a uniform resource identifier (URI).

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
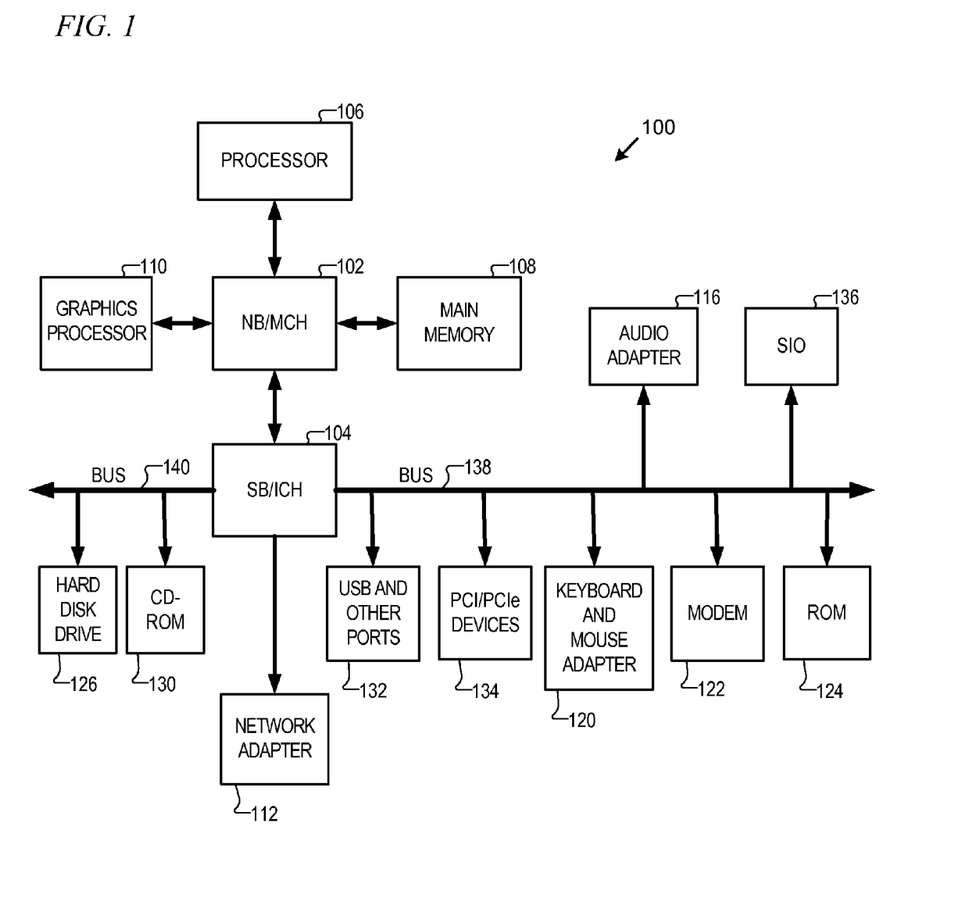
FIG. 1 is a block diagram of a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106, and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus, and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable storage device(s) may be utilized. A computer readable storage storage device may be, for example, but not limited to, an electronic, magnetic, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device. The term "computer-readable storage device" does not encompass a signal propagation media such as a copper cable, optical fiber or wireless transmission media.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The illustrative embodiments permit a server to provide messages to clients via client connections by reducing disproportionate resource usage by clients associated with poor performing client connections. In response to detecting poorly performing client connections, a server can identify an alternate message source for such poorly performing clients. Thereafter, the server may either drop packets originating from such clients or provide some error messaging to such clients. Accordingly, latency of the server can be improved for clients that are performing poorly, and continue to obtain messages, for example, using publish/subscribe methods.

Figure 2:
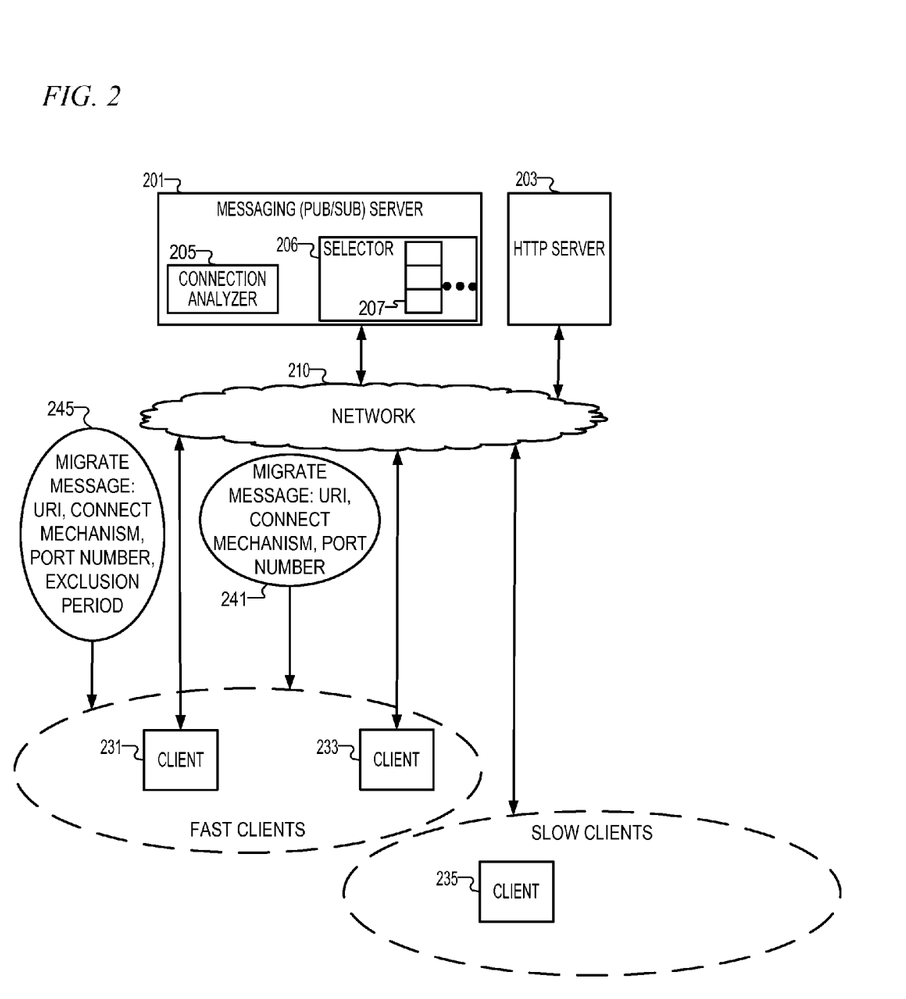
FIG. 2 is a block diagram of a networking environment in accordance with an illustrative embodiment of the invention.

FIG. 2 is a block diagram of a networking environment in accordance with an illustrative embodiment of the invention. Messaging server 201 connects by network 210 to exchange packets with clients, such as clients 231, 233, and 235. Network 210 may also connect to a secondary server, such as hypertext transport protocol (HTTP) server 203, to exchange packets with clients. Messaging server 201 may host several software components, such as, for example Java objects. Software components may include connection analyzer 205 and selector 206. Additional software components in messaging server 201 may control the receiving of environment data, concerning, for example, topics of interest to the owners of the clients. Environment data can be collected locally or remotely. An example of environment data may be recent score and progress of a sporting match.

Selector 206 may be a software component that monitors transport control protocol (TCP) buffer such as TCP buffer 207. Each TCP buffer may be setup and removed in response to the connection, re-connection, and disconnections of a client. Accordingly, there can be one TCP buffer. Each buffer may store packets that are prepared for sending or that have been sent, but not yet acknowledged by the client. A non-responsive client may have a correspondingly full TCP buffer controlled by the selector.

Connection analyzer 205 may collect statistics concerning the stacks and assign an attribute to a client based on observed select write call behavior. A 'select write call' or 'select write operation' requests the selector to provide a list of clients that are ready to receive messages. In other words, in a select write call, the selector generates a list of all clients that are ready for writing. A select write call may be triggered by a full TCP buffer of the client, stored in the server. The select write call can be indirectly triggered by client failing to acknowledge a message. A select write call behavior is the log, or other recordation of the number of select write calls, that were triggered by a full TCP buffer associated with a client. For example, a select write call that is triggered within 20 seconds of a previous select write call, associated with a client, may be above a threshold previously set for acceptable client behavior. A threshold is a frequency of select write calls that is permissible to be sustained by the server with respect to any client. The threshold may be expressed as a minimum delay between triggered select write calls for the client. Accordingly, a threshold of select write calls is a number that is used to compare select write calls for a client in order to trigger further action when the select write calls are exceeded.

The threshold may be set by an administrator of the server, left as a default by a manufacturer of the server, adjusted based on loading of the server, or a combination of these drivers. For example, when the server is lightly loaded, the threshold frequency may be higher than when the server is heavily loaded.

Alternatively, the threshold may be adapted to recently observed behavior of an aggregate of all clients. For example, the occurrences of select write call behavior can provide a delay for each client. An average of the clients having these delays may be calculated, and the average may be used as the threshold.

In other words, if a frequency of select write call occurrences for each client can be determined and an average value for such occurrences is calculated, a threshold may be set at some fraction of a recently determined average value.

A further example may rely on a threshold that is a fraction of averaged select write call behavior. In other words, if an average delay between occurrences is 30 seconds, a preset fraction, such as, for example, ⅔ may be used to set a threshold of 20 seconds. Accordingly, clients that trigger select write calls more frequently than 20 second intervals may be selected due to the threshold being passed. Accordingly, based on such an average, the client would be added to the set of slow clients, and redirected to an alternate server. An average is the arithmetic average of all clients for which select write call frequency information is available.

A modified average may be determined for populations of clients that have not yet experienced a select write call occurrence by not counting such clients in the average.

For varying reasons, a client connection can behave badly. The client connection may be slowed by distance, congestion, poor radio links, etc. In any event, responsive to the messaging server detecting that a client has a bad client connection, the messaging server can transmit a migrate message, such as migrate message 241 or 245. A migrate message is a message directed to a client that contains information sufficient for the client to establish a second connection to a second server for purposes of receiving bulk updates via another mechanism such as HTTP. The migrate message may be detailed in that it can carry, as in the example of migrate message 245, a uniform resource identifier (URI), a port number, a connect mechanism, as well as an exclusion period. A Uniform Resource Identifier is a string of characters used to identify a name or a resource on the Internet. The exclusion period is optional—accordingly, migrate message 241 uses the first three parameters, a URI, a port number, and a connect mechanism, to indicate to the client the new source for subscriptions. It is appreciated that migrate messages may be shorter and contain a number that references information earlier received at a client. In other words, a secondary server may be identified early in a persistent connection to which a serial number is assigned. Accordingly, a reference by the serial number to the alternate server, which may be one among several, can be accomplished with a terse message, as compared to migrate messages 241 and 245. Illustrative embodiments segregate clients into two groups, namely fast clients and slow clients. Slow clients can be clients 231 and 233. Slow clients can include client 235. It is appreciated that a client can change status depending on the apparent behavior detected at a messaging server. Accordingly, the messaging server may classify such a client initially as a fast client, but later, determine it to be a slow client.

Figure 3:
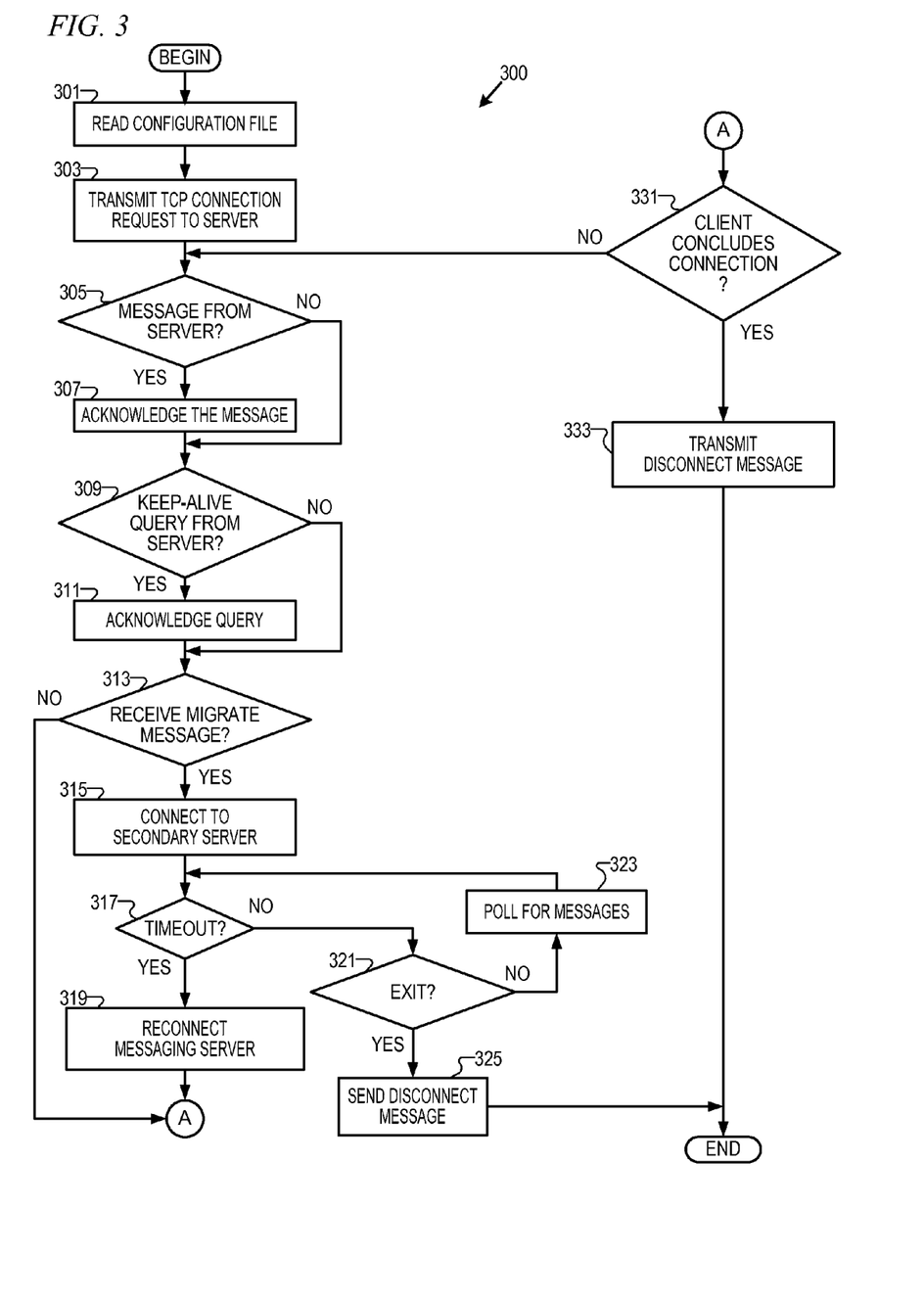
FIG. 3 is a flowchart of client operations in accordance with an illustrative embodiment of the invention.

FIG. 3 is a flowchart of client operations in accordance with an illustrative embodiment of the invention. Initially a client may read a configuration file (step 301). The client may be, for example, any one of clients 231, 233, and 235, of FIG. 2, arranged using some or all components of data processing system 100 of FIG. 1. The client may rely on network 210, also of FIG. 2, which may be a combination of wired and wireless links. In this manner, the client may establish a persistent connection with the messaging server or the http server.

Next, the client may transmit a transport control protocol (TCP) connection request to the messaging server (step 303). The TCP connection request can include a subscription message using a publish-subscribe protocol. The subscription message may include, for example, a description of the topic, for example, "Tennis U.S. Open court assignments". At this point, a persistent connection may be established to the messaging server. A persistent connection is a connection between two data processing systems, using a link that may include a network such that each data processing system maintains state information concerning the link until a data processing system disconnects the persistent connection or a data processing system fails to acknowledge a message of its counterpart within a timeout period. A client connection is a persistent connection where at least one of the data processing systems is a client.

A connect method or connect mechanism is a data processing system configured to operate a specific protocol using specific uniform resource identifier used to establish a connection. In client operations 300, the initial connect mechanism can be TCP transmitted to an IP address of the messaging server. In this case, TCP is the specific protocol, and the IP address is the uniform resource identifier.

Next, the client may determine if it has received a message from the server (step 305). If a message is received, the client may acknowledge the message (step 307). The client may acknowledge the message by sending an acknowledgment packet to the source of the message. The client may take further steps consistent with the message. For example, if the message relates to a topic that the client subscribes to, a corresponding change can be made to a user interface on the client, e.g. a dashboard.

Following step 307 or a negative result at step 305, the client may determine whether a keep-alive query is received from the server (step 309). A server may send a keep-alive query to determine if the client continues to be reachable by the link or network. The client, upon a positive determination, may acknowledge the query (step 311). Following step 311 or a negative result at step 309, the client may determine whether a migrate message is received (step 313). As described above, the migrate message may include a connect mechanism. The connect mechanism specifies a networking protocol. A networking protocol may be any networking protocol selected from a group including transport control protocol or hypertext transport protocol. In addition, the migrate message may be encapsulated within a disconnect message.

Responsive to a positive determination at step 313, the client may connect to a secondary server (step 315). This step can be performed by using the connect mechanism, port number, and URI of the migrate message.

After connecting to a secondary server, for example hypertext transfer protocol (HTTP) server 203, of FIG. 2, the client may iteratively check whether a timeout has occurred (step 317). Such a timeout may be set to expire based on an exclusion period set in a migrate message. An exclusion period is a time that a client is instructed to rely on a secondary server, and in particular, one that is not a publish-subscribe server. Accordingly, while negative determination occur at step 317, steps 321 through 323 may be repeated. Steps 317-323 may be more computationally intensive for the client. However, directing the client to these steps can relieve the messaging server from computationally intensive tasks in a manner that does not disrupt other clients.

The client may determine whether to exit (step 321). If the client does not exit its connection with the secondary server, the client may poll for messages (step 323). Polling may be by way of the client sending an http request to the http server. Accordingly, the migrate message may describe client-initiated polling method. In this case, the client-initiated polling method is an HTTP request. Next, the client may further check for a timeout (step 317).

If the client concludes the connection, processing will determine a positive outcome to step 321. Accordingly, the client may send a disconnect message (step 325). A disconnect message is a TCP or HTTP message used to end a persistent connection. Processing may terminate thereafter.

A positive determination may occur at the timeout determining step 317. At that time, the client may have spent an exclusion period communicating with a secondary server, such as http server 203 of FIG. 2. Thus, the client may reconnect to the messaging server (step 319). Nevertheless, the client may not need to reconnect, since the previous connection may have been maintained contemporaneously with the client communications to the HTTP server.

Next, or following a negative determination to a migrate message, the client may determine whether to conclude the connection (step 331). A negative determination returns processing to step 305. A positive determination may cause the client to transmit a disconnect message (step 333), for example, to the messaging server, such as messaging server 201 of FIG. 2. Processing may terminate thereafter.

The foregoing steps can allow a client to respond to feedback originating from a messaging server in a manner to migrate off the messaging server in response to a migrate message. However, the client operations 300 can provide the client an opportunity to restore connectivity to the messaging server after a period that may be long enough for the client to emerge from any transitory difficulties it may have.

Figure 4:
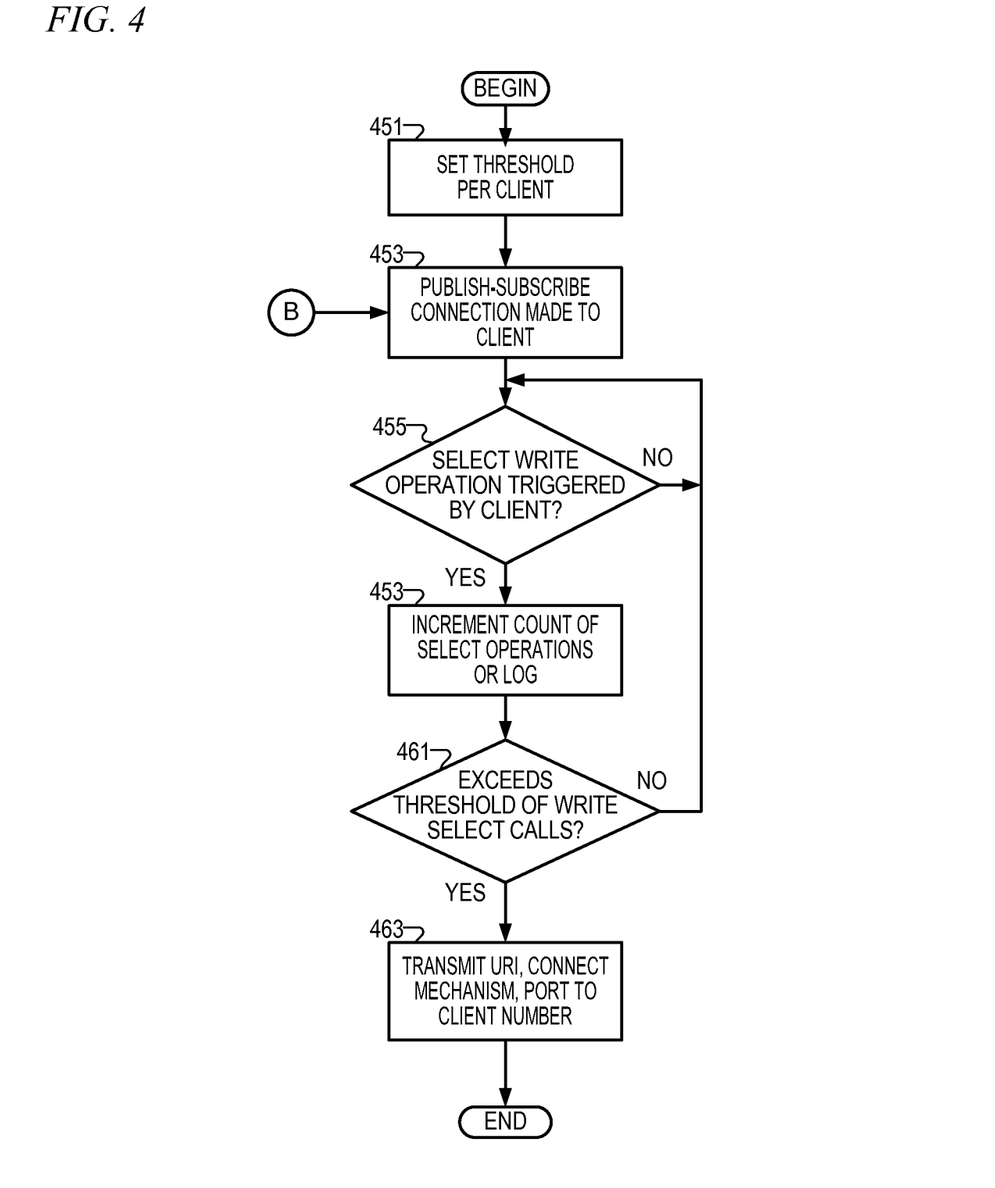
FIG. 4 is a flowchart of messaging server operations in accordance with an illustrative embodiment of the invention.

FIG. 4 is a flowchart of messaging server operations in accordance with an illustrative embodiment of the invention. Initially, the messaging server may set a threshold per client (step 451). The threshold may be used to compare an attribute of the client connection. An attribute is a number that correlates to a degraded connection from messaging server to client. An attribute can be, for example, the number of select write operations that occur during a period. Accordingly, a high number of select write operations can suggest a degraded connection to the client. An attribute may be a percent occupancy that a TCP queue is filled with data.

Next, the messaging server may make a publish-subscribe connection to the client (step 453). As will be described in FIGS. 5A and 5B, the messaging server may determine whether the client remains in an exclusion period and may cause the following further steps to be performed. Next, the messaging server may determine if a select write operation is triggered by a client (step 455). Alternatively, the messaging server may determine if a full TCP buffer is caused by the client. Step 455 may periodically check each client among a set of clients having persistent connections to the messaging server. A negative determination can cause the messaging server to repeatedly execute step 455 until the select write operation is triggered. A positive determination may cause the messaging server to increment a count of select operations or log for the client (step 457). The log or other recordation of client status can establish the select write call behavior for a particular client connection. A log is a data structure for recording events. The log can be, for example, a flat file. The log could be a ring buffer. The log has sufficient storage to record at least two attributes, for example, select write calls.

Next, the messaging server may determine if the log records attributes that exceed the threshold of write select calls (step 461). The log may be considered for a recent time-period. Alternatively, the log may be used to account for all select write operations caused by the client. The duration of the recent time-period can be a system tunable preset by an operator of the messaging server.

The log can be used to develop a time-based rate. A time-based rate is a number of events, such as select write calls, that occur during a given period. The time-based rate can depend upon a clock used by a data processing system to assign times to each occurrence of the event. A negative determination can cause the messaging server to repeat step 455 and those that follow. However, a positive result to step 461 can cause the messaging server to transmit a URI, connect mechanism, and port number to the client (step 463). Such a transmission is the migrate message, described above. Optionally, the messaging server may transmit an exclusion period as part of the migrate message.

Step 463 may include the messaging server tracking a client, and measuring whether the client has satisfied any exclusion period prior to re-admitting or reconnecting the client to the messaging server. Accordingly, the messaging server may bar the client from accessing resources of the server for an exclusion period set to run contemporaneously with transmitting the migrate message. Responsive to the exclusion period expiring, re-connecting to the client. Reconnecting may occur, in some cases, when the messaging server makes a publish subscribe connection to the client, for example, at step 453.

In addition, the messaging server may set the exclusion period to be proportional to a difference between the attribute and the threshold. In other words, if the behavior is twice as bad as other clients barred from the server, the server may set the exclusion period to be twice as long for exceptionally bad behaving clients. Consequently, reconnection of the client can be based on the exclusion period expiring for the client so excluded or barred.

Figure 5A:
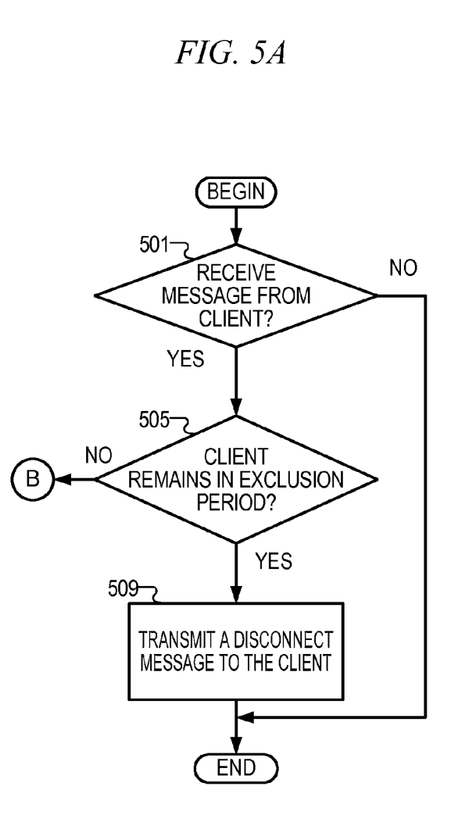
FIG. 5A is a flowchart for a messaging server to respond to clients excluded from the messaging server in accordance with an illustrative embodiment of the invention.

FIG. 5A is a flowchart for a messaging server to respond to clients excluded from the messaging server in accordance with an illustrative embodiment of the invention. Initially, the messaging server may determine whether it has received a message from the client (step 501). If not, the processing to terminate thereafter.

However, if a message is received, the messaging server may determine whether the client remains in an exclusion period (step 505). If not, the messaging server may execute steps of segregating clients at step 453 in FIG. 4. Otherwise, the client may transmit a disconnect message to the client (step 509). Processing may terminate thereafter.

Figure 5B:
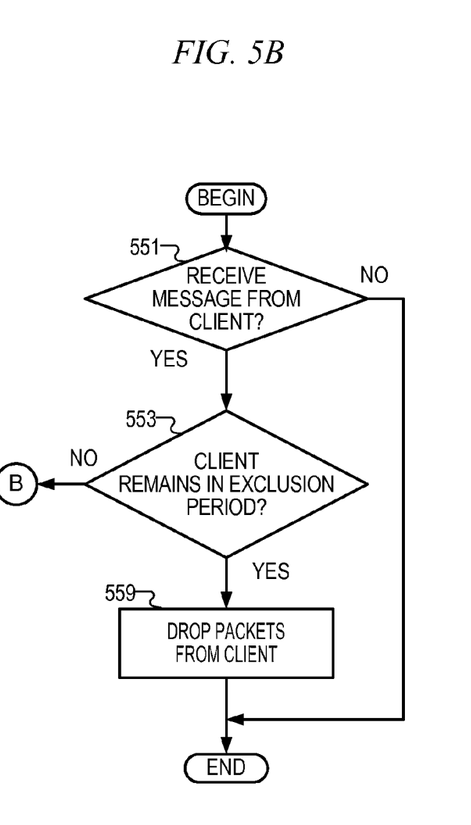
FIG. 5B is an alternative flowchart for a messaging server to respond to clients excluded from the messaging server in accordance with an illustrative embodiment of the invention.

FIG. 5B is an alternative flowchart for a messaging server to respond to clients excluded from the messaging server in accordance with an illustrative embodiment of the invention. Like the flowchart of FIG. 5A, the messaging server may determine whether it has received a message from the client (step 551). If not, the processing to terminate thereafter.

Again, the messaging server, in response to a positive determination, may determine whether the client remains in an exclusion period (step 553). A negative determination can cause further steps to be performed, for example, step 453 in FIG. 4. However, if the client remains in the exclusion period, the messaging server may drop packets from the client (step 559). Processing may terminate thereafter.

As can be seen, illustrative embodiments of the invention may allow a messaging server to rotate clients to an alternate server in a manner that can eliminate select write operations that previously would have been persistently impacting the messaging server, due to the poor performance of the corresponding client connection. Such relief on a processor can permit the processor to avoid lags at the messaging server that otherwise would occur, and impact the user experience for faster clients. Accordingly, users of the faster clients may enjoy an improved user experience, even if only a minority of clients are placed into a 'slow client' class and redirected to use an alternate server, such as an HTTP server. In addition, a messaging server may be able to serve more messages to clients using an illustrative embodiment where most bad behaving clients are removed from the pool of clients with which the messaging server provides publish subscribe messages. This arrangement is an improvement over the prior art where a messaging server can serve fewer messages to a mixed population of clients.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable storage device providing program code for use by or in connection with a computer or any instruction execution system. For the purposes of this description, a computer-usable or computer readable storage device can be any tangible apparatus that can contain, or store the program for use by or in connection with the instruction execution system, apparatus, or device.

The computer-readable storage device can be an electronic, magnetic, electromagnetic, or semiconductor system (or apparatus or device). Examples of a computer-readable storage device include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing client connections to a server among a plurality of clients, the computer implemented method comprising:
    determining, by one or more processors, that a rate of select write calls of a first client exceeds a predetermined threshold, and
    in response, a first server transmitting a migrate message to the first client, the migrate message including a uniform resource identifier that describes a second server; and
    responsive to transmitting the migrate message, the first server barring the first client from accessing resources of the first server for an exclusion period, and responsive to the expiration of the exclusion period, the first server reconnecting to the first client.

2. The computer implemented method of claim 1, further comprising:
    selecting a second client that connects to the first server using select write calls, wherein selecting comprises determining, by one or more processors, that a rate of select write calls of the first client exceeds the predetermined threshold; and
    responsive to selecting the second client, retaining the second client based on the second client being below the predetermined threshold, wherein the predetermined threshold is an average of select write call behavior of the first client and select write call behavior of the second client.

3. The computer implemented method of claim 1, further comprising:
    after barring the first client, receiving a message from the first client; and
    responsive to receiving the message, transmitting a disconnect message to the first client.

4. The computer implemented method of claim 1, wherein barring the first client further comprises dropping packets originating from the first client.

5. The computer implemented method of claim 1, wherein the exclusion period is proportional to a difference between the rate of select write calls and the predetermined threshold, and wherein re-connecting the first client is based on the exclusion period expiring.

6. The computer implemented method of claim 1, wherein the migrate message describes a connect mechanism that is a client-initiated polling method.

7. A computer program product for managing client connections to a server among a plurality of clients, the computer program product comprising:
    a computer readable storage device having computer usable program code stored on the computer readable storage device, the computer usable program code comprising:
    first program instructions to determine that a rate of select write calls of a first client at a first server exceeds a predetermined threshold and in response, transmit a migrate message to the first client, the migrate message including
    a uniform resource identifier that describes a second server;
    second program instructions, responsive to transmitting the migrate message, to bar the first client from accessing resources of the first server for an exclusion period, and responsive to the expiration of the exclusion period, reconnecting the first client to the first server; and
    wherein the first and second program instructions are stored on the computer readable storage device.

8. The computer program product of claim 7, further comprising:
    third program instructions to select a second client that connects to the server using select write calls, wherein selecting comprises first determining, by one or more processors, that a rate of select write calls of the first client exceeds the predetermined threshold;
    fourth program instructions to retain the second client based on the second client being below the predetermined threshold, wherein the predetermined threshold is an average of select write call behavior of the first client and select write call behavior of the second client, responsive to selecting the second client; and
    wherein the third and fourth program instructions are stored on the computer readable storage device.

9. The computer program product of claim 7, further comprising:
    after barring the first client, third program instructions to receive a message from the first client;
    responsive to receiving the message from the first client, fourth program instructions to transmit a disconnect message to the first client; and
    wherein the third and fourth program instructions are stored on the computer readable storage device.

10. The computer program product of claim 7, wherein second program instructions to bar the first client further comprises third program instructions to drop packets originating from the first client.

11. The computer program product of claim 7, wherein the exclusion period is proportional to a difference between the rate of select write calls and the predetermined threshold, and wherein re-connecting the first client is based on the exclusion period expiring.

12. The computer program product of claim 7, wherein the migrate message describes a connect mechanism that is a client-initiated polling method.

13. A computer system for managing client connections to a server among a plurality of clients, the system comprising:
   a processor, a computer readable memory and a computer readable storage device;
   first program instructions to determine that a rate of select write calls of a first client at a first server exceeds a predetermined threshold and in response, transmit a migrate message to the first client, the migrate message including
   a uniform resource identifier that describes a second server;
   second program instructions, responsive to transmitting the migrate message, to bar the first client from accessing resources of the first server for an exclusion period and responsive to the expiration of the exclusion, reconnecting the first client to the first server; and
   wherein the first and second program instructions are stored on the computer readable storage device for execution by the processor via the computer readable memory.

14. The computer system of claim 13, further comprising:
   third program instructions to select a second client that connects to the server using select write calls, wherein selecting first determining, by one or more processors, that a rate of select write calls of the first client exceeds the predetermined threshold;
   fourth program instructions to retain the second client based on the second client being below the predetermined threshold, wherein the predetermined threshold is an average of select write call behavior of the first client and select write call behavior of the second client, responsive to selecting the second client; and
   wherein the third and fourth program instructions are stored on the computer readable storage device for execution by the processor via the computer readable memory.

15. The computer system of claim 13, further comprising:
   third program instructions to receive a message from the first client, the instructions to receive being responsive to second program instructions to bar the first client;
   responsive to receiving the message from the first client, fourth program instructions to transmit a disconnect message to the first client; and
   wherein the third and fourth program instructions are stored on the computer readable storage device for execution by the processor via the computer readable memory.

16. The computer system of claim 13, wherein second program instructions to bar the first client further comprises third program instructions to drop packets originating from the first client.

17. The computer system of claim 13, wherein the exclusion period is proportional to a difference between the rate of select write calls and the predetermined threshold, and wherein re-connecting the first client is based on the exclusion period expiring.

18. The computer system of claim 13, wherein the migrate message describes a connect mechanism that is a client-initiated polling method.

* * * * *